United States Patent [19]

Neff

[11] 4,095,092
[45] June 13, 1978

[54] AQUATIC ANIMAL COUNTING

[76] Inventor: Gregor N. Neff, 85 Myrtle Ave., Dobbs Ferry, N.Y. 10522

[21] Appl. No.: 722,417

[22] Filed: Sep. 13, 1976

[51] Int. Cl.² ............ G06M 11/00; A01K 61/00
[52] U.S. Cl. .......................... 235/92 PK; 235/92 ST; 235/92 R; 235/98 B; 119/3
[58] Field of Search ........ 235/92 PK, 92 TC, 92 ST, 235/92 ME, 98 B, 98 R; 346/33 EC, 33 R; 221/7; 209/74 M, 83; 119/3; 43/56, 100

[56] References Cited

U.S. PATENT DOCUMENTS

| | | | |
|---|---|---|---|
| 2,690,158 | 9/1954 | Petty | 119/3 |
| 2,791,862 | 5/1957 | Shook | 235/92 PK |
| 3,096,600 | 7/1963 | Gwyther | 119/3 |
| 3,166,043 | 1/1965 | Castillo | 119/3 |
| 3,204,605 | 9/1965 | Vroman | 119/3 |
| 3,519,129 | 7/1970 | Peterson | 209/83 |
| 3,803,497 | 4/1974 | Fah Mim Tyau | 235/92 ST |
| 3,833,119 | 9/1974 | Brown | 119/3 |

*Primary Examiner*—Joseph M. Thesz
*Attorney, Agent, or Firm*—Curtis, Morris & Safford

[57] ABSTRACT

Aquatic animals (e.g., fish) are counted in the same operation in which the fish are sorted as to size. This minimizes the labor required for counting because it is the same labor as that used for sorting the animals. A grading or sorting barrier is provided with a plurality of parallel holes or passageways, and the fish are urged towards the barrier. Mounted so as to extend across each of the holes is a flexible electrode which normally forms a closed electrical switch. When the animal passes through the hole, it hits the electrode and thus opens the switch. This creates a signal which is stored in an electrical memory. The information stored in the memory is read out sequentially and counted by an electronic counter. The size of the holes in the grading barrier is such that only animals smaller than a predetermined size will pass through. This serves two functions; it sorts the larger fish from the smaller ones, and allows the operator to set the size openings at a level such that the smallest fish will be counted as they pass through the openings. Then, if desired, the openings can be enlarged, either by substituting a grading barrier with larger holes, or by means of a device which enlarges the holes mechanically, and the remainder of the fish can be counted. The grading barrier can be used when it is horizontal, either in the water or out of the water, so that gravity assists the fish in moving downwardly towards the barrier and through it. The barrier also can be vertical and placed so as to form a wall between two compartments for the fish.

21 Claims, 6 Drawing Figures

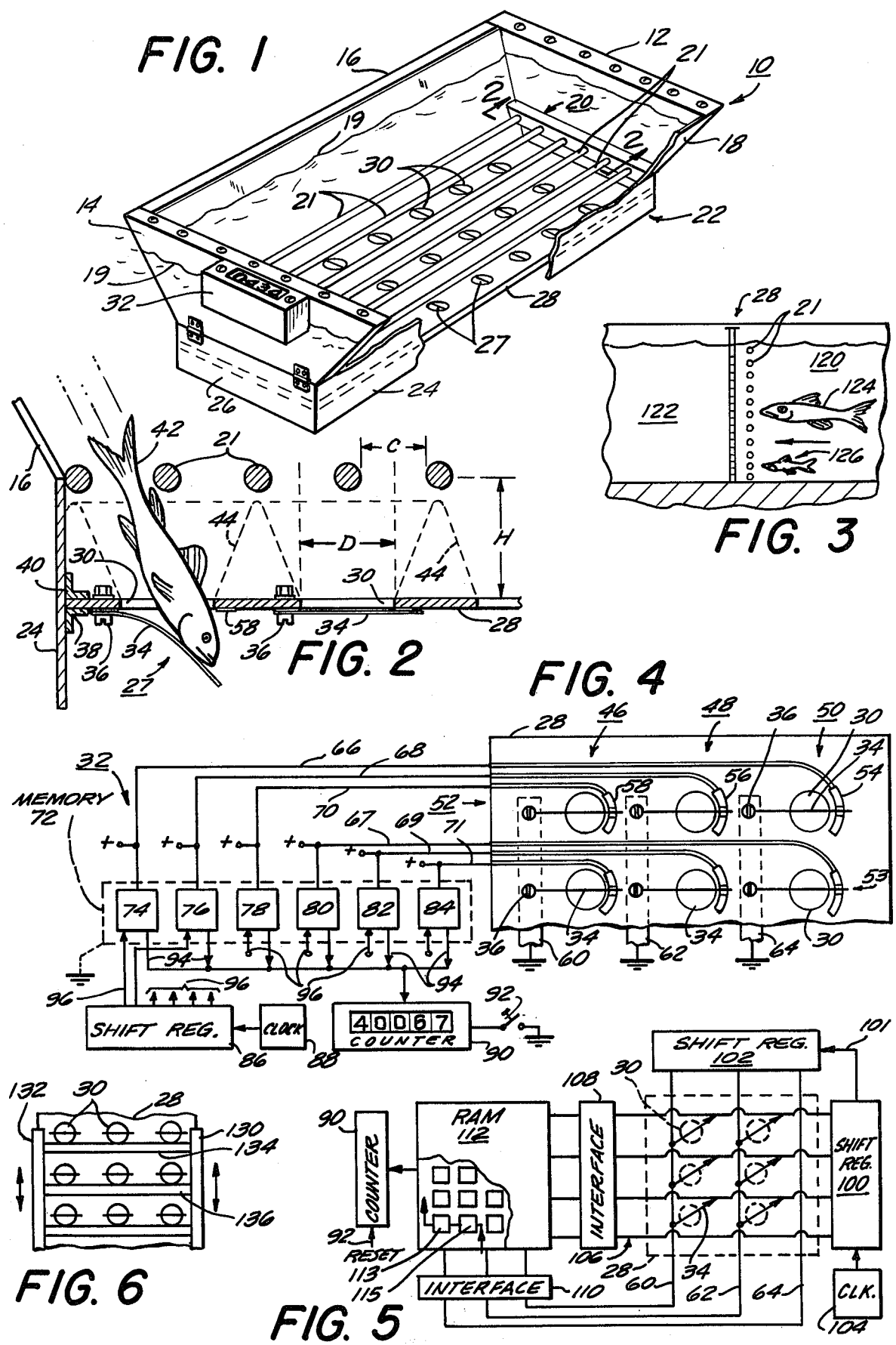

AQUATIC ANIMAL COUNTING

This invention relates to the counting of aquatic animals such as fish, and also relates to the grading or sorting of such animals.

The need for an effective device for counting aquatic animals such as fish has existed for a long time. Many different devices have been proposed, from the very simple to the very sophisticated, and it is believed that none has proved to be satisfactory to any great degree. The result is that most fish counting today is believed to be done manually by the tedious task of counting and weighing samples, and then weighing the entire group of fish. This method not only is slow but it is inaccurate.

Accordingly, it is an object of this invention to provide a fast, reliable, accurate and labor-saving device and method for counting aquatic animals. It is another object of the invention to provide such a device which is reliable in operation and relatively inexpensive to produce.

The foregoing objects are met, in accordance with the present invention, by the provision of a device and method which combines the counting operation with sorting or grading of the fish as to size, thus utilizing the same labor to grade the animals and to count them.

A grading barrier is provided with a plurality of openings. The fish are urged toward the openings. A detector near each opening detects each fish and produces an electrical signal which is counted by an electronic counter. The openings are of a size to pass only animals smaller than a pre-determined minimum size. The remaining fish can be counted, if desired, by enlarging the openings. The grading barrier can be used horizontally, either in the water or out of the water. In this case, gravity assists in urging the animals towards the barrier. The barrier also can be placed vertically between two containers for the animals, with the animals being herded toward the barrier to urge them through it.

Preferably, the detector at each opening consists of an electrode which normally contacts a contact member to form a closed switch. The passage of the animal through the hole opens the switch and creates a signal which is stored in a memory. The memory is sampled subsequently in a sequential manner and the signals are read out of the memory into a counter which counts them.

The foregoing and other objects and advantages of the invention will be set forth in or apparent from the following description and drawings.

In the drawings:

FIG. 1 is a perspective, partially broken-away and partially schematic view of a counter-sorter constructed in accordance with the present invention;

FIG. 2 is a cross-sectional, partially broken away view taken along line 2—2 of FIG. 1;

FIG. 3 is a cross-sectional schematic view of another embodiment of the invention;

FIG. 4 is a partially broken-away, partially schematic view of the underside of the grading barrier of the device of FIG. 1, together with electronic detecting and counting circuitry;

FIG. 5 is a schematic circuit diagram of another embodiment of the invention; and FIG. 6 is a schematic plan view of another embodiment of the invention.

GENERAL DESCRIPTION

FIG. 1 shows a counter-sorter device 10 constructed in accordance with the present invention. The device 10 includes an upper hopper portion having end-walls 12 and 14 and side-walls 16 and 18. In the bottom of the device 10 is a grading barrier 28. The grading barrier 28 has holes 30 of a size selected to allow only fish smaller than a pre-determined size to pass through. Each hole has an electrical switch 27 which is used as a detector which is operated when a fish passes through. A counting device 32 counts the fish by counting the number of operations of the switches. Thus, both grading and counting of the fish can be done in one operation.

Immediately above the grading barrier is a grading bar assembly 20 with parallel grading bars 21 which are spaced from one another so as to allow only fish smaller than a given size to pass through. These bars protect the switches 27 from false actuation by fish too large to pass through the holes 30.

Now considering the counter-sorter device 10 in greater detail, the walls 12 and 14 of the device 10 preferably are hollow and filled with a foam material such as polystyrene in order to cause the device 10 to float on water. The water level when the device 10 is floating is indicated at 19. A housing assembly 22 is provided beneath the grader bar assembly. The assembly 22 includes a skirt 24 forming a housing, and the grading barrier 28. The skirt 24 has a hinged end-wall 26, and guides 38 and 40 (see FIG. 2) so that the panel 28 can be moved in and out of the unit 22 by lifting the hinged end-wall 26 and sliding the panel 28 along the guides 38 and 40.

Referring now to FIG. 2, which is a cross-sectional view taken along line 2—2 of FIG. 1, the holes 30 in the grading barrier 28 are spaced so that there is one row of holes for every pair of grader bars 21. The Diameter D of each hole is the same as or slightly larger than the spacing C between adjacent bars 21. The height H between the grading barrier and the bars 21 is sufficient to prevent fish too large to pass between the bars 21 from activating the switches in the holes 30 as they writhe and swing their bodies about.

Referring again to FIG. 2, the fish being counted, such as the fish 42, swim between the grading bars 21 and downwardly towards one of the holes 30. As the fish passes through the hole, it bends the thin, flexible contact member 34 which is attached across the hole and opens the switch 27. The opening of the switch is used to develop an electrical signal. Such signals are counted by the electronic counting device 32, which indicates the total number of fish passing through.

In order to regulate the flow of fish through the holes 30, frustro-conical guides 44 (shown in dashed outline in FIG. 2) can be provided. In effect, these guides form funnels leading to each hole 30 and help to keep fish from becoming trapped between the bars 21 and barrier 28, as well as guiding the fish towards the holes.

It also should be understood that the holes can be more or less numerous relative to the grader bars 21 than indicated in FIG. 2, if desired.

Although the device has been described as operating while immersed in water, a form which is preferred for some fish species such as channel catfish, the device then also can be operated in the open air with certain other species such as trout and salmon. In either case, the barrier is horizontal so that gravity assists in the operation.

The device 10 also can be operated as a vertical barrier between two adjacent bodies of water as is illustrated in FIG. 3. FIG. 3 shows the grading barrier 28 aligned vertically, as are the grader bars 21. The barrier 28 separates two adjacent bodies of water 120 and 122, for example, in a raceway. Large fish 124 cannot pass through the grading barrier, but small fish 126 can. They are counted then in the same way as in the other embodiments described herein.

ELECTRICAL DETECTION CIRCUITRY

Returning now to FIG. 2, each electrode 34 of each switch 27 is a thin stainless steel wire which is secured to one end to a mounting post 36. The wire 34 is resilient and normally makes electrical contact with a metallic contact member 58 on the opposite edge of the hole which the electrode 34 bridges. When the fish 42 passes through, it breaks the contact by moving the wire 34, thus providing a substantial change in the electrical impedance through the switch. This changes is used to provide an electrical signal which is detected by the electronic circuitry to be described below. One advantage of the invention lies in the fact that the operation of the switch provides a substantial impedance change and, therefore, a reliable indication, regardless of whether the device 10 is immersed in water (even salt water) or is used in the open air.

FIG. 4 shows the counter mechanism 32, together with a portion of the underside of the barrier 28. The holes 30 are arranged in rows and columns. Two rows 52 and 53 and three columns 46, 48 and 50 of holes are shown in FIG. 4. Each of the binding posts 36 is connected through the insulating material of the barrier 28 to a metal bar or strip 60, 62 or 64 associated with each of the three columns of holes. Each of these strips preferably is applied to the board 28 by conventional printed circuit technology, and is coated with a protective material, such as epoxy resin, except at points where electrical contact is made. The strips 60, 62 and 64 are on the upper or opposite surface of the sheet 28. They are not shown in FIG. 1 for the sake of clarity in the drawings.

On the underside of the board 28 are printed-circuit conductors leading to the contacts 58, 56 and 54. The electrodes 34 make contact with the conductors 54, 56 and 58.

Connected as shown to the conductors leading to the contacts 54, 56 and 58 are external conductors 66, 68 and 70. Similar conductors 67, 69 and 71 are connected to the conductors leading to the contacts for the other row 53 of holes.

The conductors 66-71 are connected to an electronic memory shown in dashed outline at 72. The memory 72 preferably consists of several latching circuits 74, 76, 78, 80, 82 and 84, each of whose function is to store the signal it receives on its upper input lead and then to deliver a corresponding signal over its lower output lead 94 when enabled by a signal delivered over a line 96. A conventional shift register 86 driven by high-frequency signals from a clock source 88 is provided as a scanner. The shift register applies an output pulse on each of its output leads 94 in sequence, and automatically repeats this operation over and over again. The shift register thus scans the latches and reads the stored signals out sequentially to a conventional electronic counter 90. The counter 90 can be reset by means of a conventional reset switch 92.

From the above description it can be seen that each of the electrodes 34 and its corresponding contacts 36, 58, etc. forms a switch which is normally closed. If the shift register 86 enables one of the latches 74, 76 etc. while the associated switch is closed, a signal is not delivered by the latch, and a count is not registered in the counter 90. If, however, the switch has been opened by the passage of an aquatic animal through one of the holes 30, then the latch stores a signal. Actually, the latch is a flip-flop which is switched to a new state by the opening of the switch, and is reset by the shift register. When the sampling signal comes from the shift register, a signal is delivered to the counter 90 which counts it, and the latch is reset to await another signal.

Preferably, the clock rate (output frequency) of the clock 88 is much higher than the frequency with which fish pass through the grading barrier so that the sequential sampling of the latches and the storage of the signal until the sampling is done enables fish to pass through various holes simultaneously without any fish being missed.

FIG. 5 shows an alternative embodiment of the invention in which the vertical conductors 60, 62 and 64 of FIG. 4 are arranged with horizontal conductors 106, one for each row of holes, to form a matrix. Each of the electrodes 34 is connected between one of the vertical conductors 60, 62 or 64 and one of the horizontal conductors associated with the row of holes to which the electrode 34 belongs. A clock source 104 drives a first shift register 100 which sequentially enables each of the horizontal lines 106, and then repeats the cycle. A second shift register 102 enables one of the vertical lines 60, 62 or 64. At the end of each cycle, the shift register 100 develops a signal on line 101 which shifts the second shift register 102 and thus changes the selected one of the vertical lines 60, 62 and 64. In this manner, selected ones of the vertical lines and the horizontal lines are enabled so that the condition of each switch can be determined uniquely. The information regarding the condition of each switch is read out by sending the shift register pulses through interface circuits 108 and 110 to a random access memory 112 in which the condition of each separate switch is stored at a unique location in the memory. The information stored in the memory 112 then is read out (preferably under the control of the clock source 104) to the counter 90, which indicates the total number of fish counted.

The circuit shown in FIG. 5 has the advantage, compared with the circuit in FIG. 4, that it does not require as many individual conductors leading from the board 28 to external circuitry. This leaves more space on the boards for holes and reduces the complexity and cost of the board.

In accordance with another aspect of the present invention, safety features are provided to ensure that an opening of the switch is caused by a fish passing through. It is known that fish or other species of aquatic animals with which the device is used will require a certain amount of time to pass through the hole 30. A shift register can complete many cycles in the time it takes for a fish to pass through one of the holes. Therefore, preferably, when a signal is received from one of the switches indicating that it is open, this is not taken as the indication of a fish passing through until such time as the signal has endured during each of several successive sampling cycles. This is accomplished by using a counter at each location in the memory to count up to a count of three or four before a signal is stored. If, for example, less than four signals are received before a switch is closed again, then no signal is stored in memory, the counter at that memory location is reset to zero, and the counter does not count. This feature of the invention discriminates against and minimizes the counting of spurious switch openings due to water currents and other extraneous causes.

It is preferred that the random-access memory 112 be of the MOS FET type, in which each memory cell consists of a semi-conductor flip-flop circuit. In such a memory, successive cells (e.g. 113, 115 in FIG. 5) can be connected together in series to form a counter with a minimum of extra circuitry.

VARIATIONS

If desired, all of the fish in a batch can be counted in one counting operation without sorting them. This can be done simply by selecting holes 30 and openings between grader bars 21 large enough so that all of the fish in the batch will pass through.

Alternatively, the counting and sorting operation can be done in two or more different steps, the first one for sorting out small fish from the larger ones, with one size of hole 30, and the second step with larger holes to count the remaining fish. It may be easiest to simply change the grading barrier 28 in order to change the size of the holes. Alternatively, the structure of FIG. 6 can be used to change the size of the holes. The structure in FIG. 6 includes a pair of side-rails 130 and 132 which can slide along the longitudinal edges of the panel 28, and the bars 134 and 136 attached to the bars 130 and 132. By sliding the structure along the board, the holes 30 can by covered and uncovered as desired to enlarge or constrict the holes 30. Other structures are known for performing the same function.

The above description of the invention is intended to be illustrative and not limiting. Various changes or modifications in the embodiments described may occur to those skilled in the art and these can be made without departing from the spirit or scope of the invention.

I claim:

1. A device for aquatic animal measurement, said device comprising, in combination, sorting means for sorting said animals as to size, said sorting means including barrier means for restraining the movement of said animals, said barrier means having a plurality of openings of a size predetermined to pass animals smaller than a selected size and restrain other of said animals, detecting means adjacent each of said openings to detect the passage of one of said animals through it, said detecting means including signaling means for each opening for developing an electrical signal upon the passage of an animal through said opening, storage means for storing each such signal, sampling means for sequentially sampling the signals stored in said storage means, and counting means for counting the number of animals detected by said detecting means, said counting means being adapted to count the signals taken from the storage means by said sampling means.

2. A device as in claim 1 in which said detecting means includes a thin, flexible conductor positioned at each of said openings so as to be hit by an animal passing through, said conductor normally contacting a contact member to complete an electrical circuit but being separated from said contact when hit by an animal.

3. A device as in claim 2 in which said conductor is biased towards said contact member in a direction opposite to the direction of travel of said animals through said openings.

4. A device as in claim 1 in which the sampling rate of said sampling means is much greater than the average time taken for one fish to pass through one opening.

5. A device as in claim 1 in which said detecting means comprises a switch at each opening, means for signaling a pre-determined condition of said switch, said sampling means including discriminating means for preventing the counting of said counting means until said pre-determined condition has been detected for a pre-determined number of sampling cycles.

6. A device as in claim 5 in which said discriminating means comprises further counting means for counting signals from said sampling means and developing a count signal for the first-named counting means only after a pre-determined number of successive signals of a given characteristic have been received by said further counting means.

7. A device as in claim 6 including a memory device having a plurality of cells, each comprising a flip-flop circuit, and means for connecting a plurality of said circuits in cascade to form said further counting means.

8. A device as in claim 1 in which said storage means comprises a plurality of electrical latching circuits, one to store the signal from the signaling means for each of said openings.

9. A device as in claim 1 in which said storage means comprises a random-access electronic memory circuit device with addressing logic.

10. A device as in claim 1 including switch means adjacent each opening to signal the passage of an animal therethrough, and means for discriminating between spurious operations and animal operations of said switch means on the basis of the duration of operation, and enabling said counting means only when said duration is within the normal range of duration created by the passage of such an animal.

11. A fish counting device comprising, in combination, a barrier member with a plurality of openings of a pre-determined size, a plurality of electrical switches each having a contact member bridging one of said openings, a conductive contact element positioned to be contacted by said contact member, said contact member being movable with respect to said contact element by the passage of a fish therethrough to operate said switch, means for detecting the difference in impedance, with said contact element and contact member immersed in water or air, between the open and closed condition of the switch, counting means for recording the change of impedance as a count of one fish, and storage means for storing signals representing the condition of each switch, and sampling means for sequentially sampling said signals and driving said counting means to count the fish passing through said device.

12. A device as in claim 11 in which said switch is normally closed and is positioned to be opened by the passage of a fish through the corresponding opening.

13. A device as in claim 11 in which said openings are arranged in rows and columns, with one end of each contact member in one of said rows or columns being a common conductive support, each of said contact elements being connected electrically to said storage means.

14. A device as in claim 11 in which said barrier is an insulating board with printed circuit conductors thereon to form conductive paths between each of said switches and said counting means, with a protective coating on said conductors at locations other than those at which electrical connections are made.

15. A method of counting aquatic animals, said method comprising the steps of urging said animals towards a grading barrier having a plurality of openings of a size pre-selected to pass a first group of animals smaller than a pre-determined size, detecting the passage of each animal through one of said openings, and counting each of the animals so detected, whereby said animals in said first group are both sorted and counted in a single operation, said detecting step including developing electrical signals responsive to the passage of animals through said openings, storing the signals, sequentially sampling said signals, said counting step comprising counting the signals so sampled.

16. A method as in claim 15 including increasing the size of said openings to allow the remaining animals to pass through the barrier to complete the counting of all of said animals.

17. A method as in claim 16 in which the size-increasing step comprises replacing said grading barrier with another having larger openings.

18. A method as in claim 16 in which said grading barrier is out of water and is positioned generally horizontally, and said urging step comprises placing said animals upon said barrier to subject them to the effects of gravity.

19. A method as in claim 15 including locating said grading barrier under water so as to form a barrier to the entrance of a container for said aquatic animals.

20. A method as in claim 19 including locating and orienting said grading barrier generally vertically so as to separate two containers separated substantially horizontally from one another, said urging step comprising herding said animals towards said barrier.

21. A device for aquatic animal measurement, said device comprising, in combination, sorting means for sorting said animals as to size, said sorting means including barrier means for restraining the movement of said animals, said barrier means having a plurality of openings of a size predetermined to pass animals smaller than a selected size and restrain other of said animals, detecting means adjacent each of said openings to detect the passage of one of said animals through it, and counting means for counting the number of animals detected by said detecting means, said detecting means including a switch at each opening for actuation by an animal passing therethrough said switch having a pair of terminals, said openings being arranged in rows and columns, a common row line connected to a first terminal of each of said switches in each row, and a common column line connected to the second terminal of each of said switches in each column, means for rapidly sequentially sampling each of said column lines and said row lines to detect sequentially the conditions of said switches, said counting means being adapted to count the number of switches which are in a pre-determined condition in a given time.

* * * * *